United States Patent Office 3,305,132
Patented Feb. 21, 1967

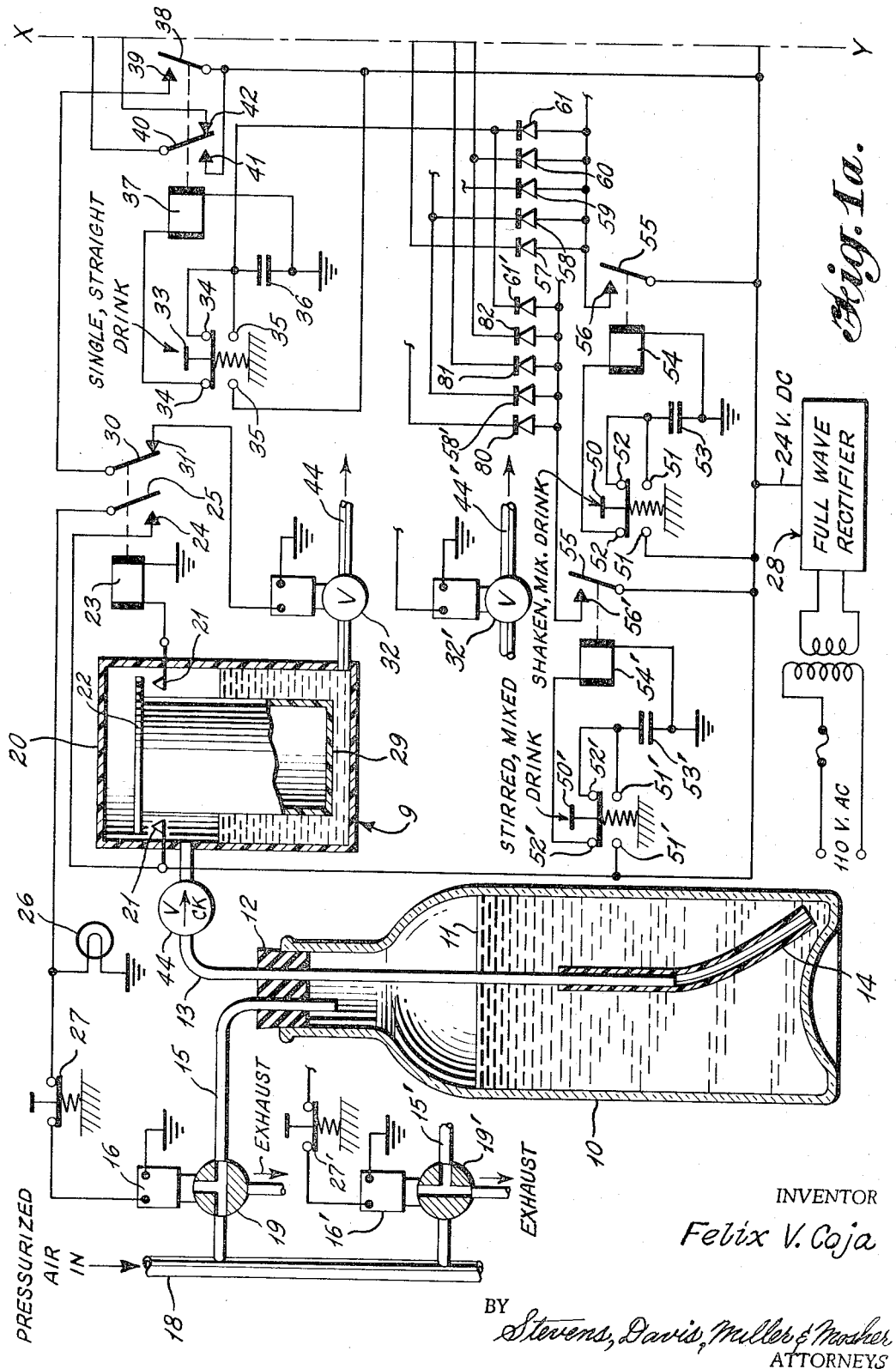

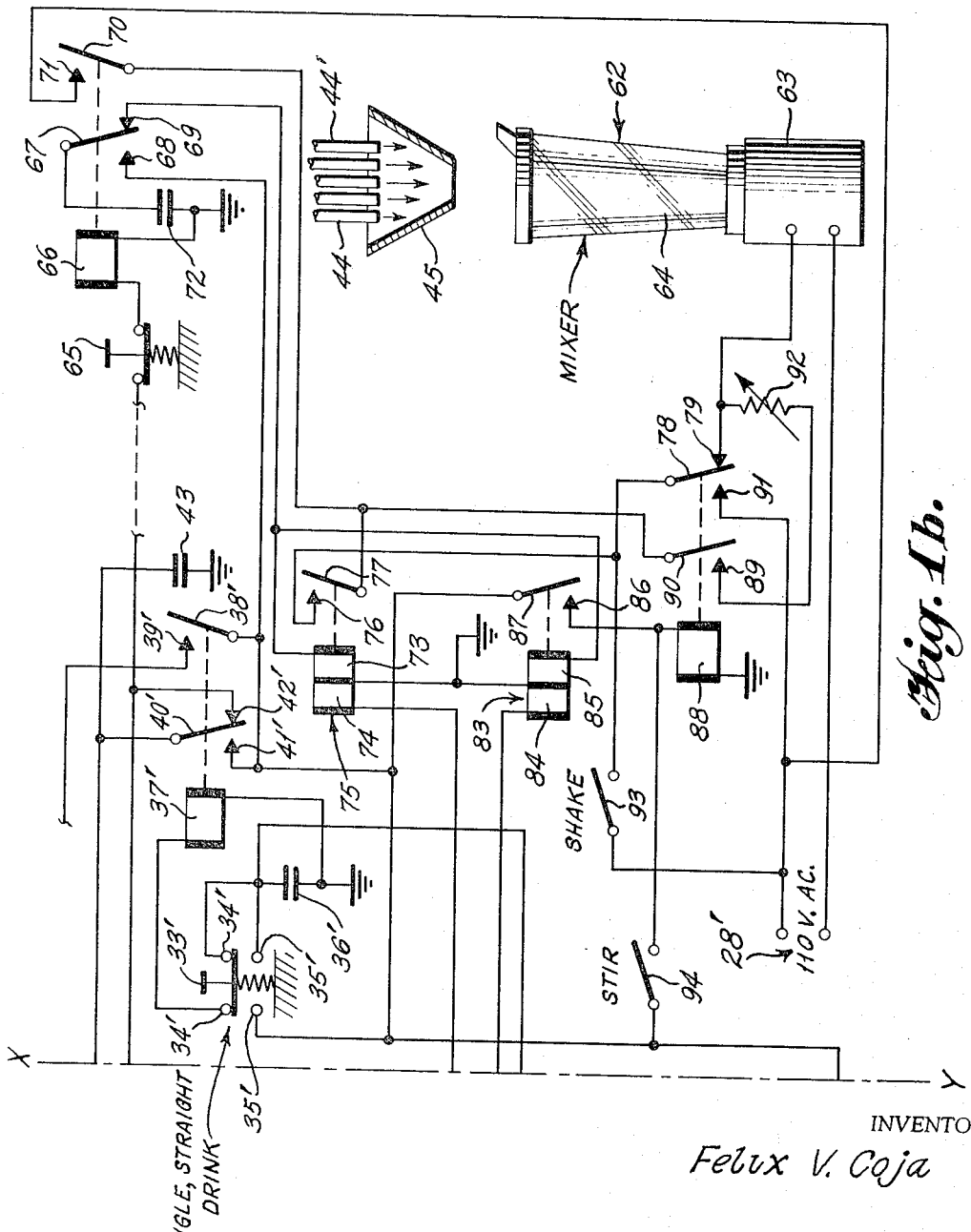

3,305,132
AUTOMATIC DEVICE FOR DISPENSING BEVERAGES
Felix Victor Coja, 1523 22nd St. NW., Washington, D.C. 20037
Filed Mar. 30, 1965, Ser. No. 444,080
16 Claims. (Cl. 222—66)

The present invention relates to an apparatus for dispensing mixed beverages.

At the present time, there are no commercially available machines for automatically dispensing mixed alcoholic beverages. A prime reason for that absence from the market is most alcoholic beverages require mixtures of precisely measured amounts of several liquid ingredients which is difficult to achieve automatically. Until the present invention, it was always necessary to manually mix alcoholic beverages by having the bartender to separately dispense measured amounts of each individual liquid into a single container, then mix, then pour the beverage into a glass. This clearly is a time consuming and costly operation for dispensing of such beverages even if mixed in quantity. Also, there is an increased chance for error resulting in a lack of uniformity of palatability of beverages mixed in quantity.

It is therefore an object of the present invention to provide an apparatus which will dispense mixed beverages.

Another object of the present invention, is to provide an apparatus which will dispense measured quantities of a plurality of liquids to form a mixed beverage.

Another object of the present invention is to provide an apparatus which will dispense measured quantities of a single liquid.

Another object of the present invention is to provide an apparatus which will dispense a plurality of beverages and mix the combined liquids at a high speed.

A further object of the present invention is to provide an apparatus which will dispense a plurality of liquids and stir the combined liquids at low speed.

The means by which the foregoing objects and other advantages, which will be apparent to those skilled in the art, are accomplished are set forth in the following specification and claims and are illustrated in the accompanying drawings dealing with a basic embodiment of the present invention. Reference is made now to the drawings in which:

FIGURES 1a and 1b jointly illustrate an embodiment of the invention with only that portion of the apparatus required for dispensing a single liquid being shown.

For sake of clarity, the drawing has been limited to illustrating but a single liquid unit of the invention. The means for dispensing the liquid: by itself, with other liquids with the resulting beverage being mixed at high speed, and with other liquids and the resulting beverage being stirred at low speed may all be readily understood from the single embodiment illustrated.

Clearly the logical place to start describing a dispensing system such as this would be to start with the step of priming the system or placing the bottles into operational condition. Referring to the single bottle embodiment illustrated, in the unprimed condition, container 20 of the float switch 9 will be empty and thus the stationary contacts 21 and float contact 22 will be closed thereby completing the circuit to energize relay 23. Energization of relay 23 will close contacts 24 and 25 thereby completing the circuit with power supply 28 to energize prime light 26 and electro-valve 16. Electro-valve 16 is illustrated in the deenergized position. When energized, the electro-valve 16 would be positioned as the electro-valve 16' has been illustrated with the pipe 15 connected to an exhaust means 19 and the inlet to a source of pneumatic pressure 18 being closed off. Electro-valve 16' serves to pressurize another bottle, not shown, the plumbing portion of which is connected in parallel with the bottle illustrated.

Priming begins by placing bottle 10 containing liquid 11 in position with top 12 replacing the original bottle stopper. Top 12 contains pipes 13 and 15. Pipe 13 has an extensible portion 14 which allows for compensation of bottles of varying sizes. Pipe 15 is connected to the previously mentioned and at this time energized electro-valve 16. In the energized position, the electro-valve 16 connects pipe 15 to an exhaust means 19 while closing the inlet port which is connected to the source of pneumatic pressure 18.

In order to prime the system, the normally closed, spring biased, priming switch 27 is depressed and held depressed until prime light 26 is deenergized. When the priming switch 27 is depressed, electro-valve 16 is deenergized thus connecting the bottle 10 with the pressure source 18. The liquid 11 will be forced through pipes 13 and 14 to fill the float container 20. As the liquid 11 rises in the container 20, float 29 will rise with the liquid to eventually open contacts 21 and 22 which in turn will deenergize relay 23. When relay 23 deenergizes contacts 24 and 25 will open turning off the prime light 26. Contacts 30 and 31 will be closed enabling but not energizing the closed electro-valve 32. As soon as the prime light 26 is deenergized, the prime switch 27 may be released. Electro-valve 16 will remain deenergized as long as the liquid level in container 20 is sufficient to keep the float 29 from closing the contacts 21 and 22. The bottle 10 will remain connected to the source of pressure 18 until the bottle is empty. The container 20 is preferably of such dimensions that it will contain a full measure of liquid when contacts 21 and 22 are closed. This will allow the beverage being dispensed to receive the full amount of liquid and not a lesser amount which would result in a less palatable beverage.

A one-way check valve 44 is located in pipe 13 between the bottle 10 and float container 20. The check valve 44 allows the last of the liquid 11 to flow into container 20 and prevents the depressurization of container 20 when electro-valve 16 energizes to depressurize bottle 10. The check valve 44 will prevent the liquid 11 from flowing back through pipe 13 while bottle 10 is being replaced.

The entire system would be primed in a manner identical to the manner of priming bottle 10. Before using the dispenser, the operator would check to see that all the prime lights 26 had been extinguished indicating the entire system had been properly primed and was ready for use.

The simplest operation of the invention is dispensing a single measure of a single liquid. This operation is carried out by depressing the desired single-shot switch 33 or 33'. The single-shot switches are spring biased to a normal position wherein, with reference to switch 33, contacts 34 are closed. Referring only to switch 33, which acts on the bottle illustrated, depressing the switch closes contacts 35 causing capacitor 36 to be charged from the potential source 28 to ground. When the operator releases 33, contacts 34 will again close completing the circuit for capacitor 36 to discharge through the winding of relay 37. The relay 37 will be energized for a period equal to that of the discharge period of capacitor 36. When relay 37 is energized, movable contacts 38 and 40 will close with contacts 39 and 41. Closing contacts 40 and 41 will cause capacitor 43 to be charged. The function of this capacitor is not too important for the single-shot operation and will be fully discussed with the multi-liquid beverages. Closing contacts 38 and 39 will complete the circuit to energize the dispensing valve 32 from the source of potential 28 through the previously mentioned closed contacts 30 and 31. Energizing the dispensing valve 29 opens the valve thereby allowing the liquid 11 to be dispensed through the pipe 44 and dispensing nozzle 45. Movable contact 38 breaks contact with contact 39 when relay 37 becomes de-energized thereby de-energizing and closing the dispensing valve 32.

The dispensing valve is a fully adjustable electro-valve thereby providing one means for adjusting the amount of liquid to be dispensed. The amount of liquid dispensed may also be controlled by the size of capacitor 36 relative to the resistance of the coil of the relay 37. A 2000 mfd. capacitor has been found suitable for dispensing the normal ounce and a half "shot" of alcoholic beverages when the resistance of the coil is approximately 500 ohms.

This control system, in conjunction with the type of switch above-mentioned, will allow the operator to dispense only the proper measured amount of liquid regardless of how long he holds the switch 33 in the depressed condition. Multiple shots may be dispensed merely by multiple depressions of the desired switch, allowing an interval for dispensing between each depression.

A second, and more complex operation of the invention is the operation for dispensing a multi-liquid beverage which is mixed at high speed, such as a daiquiri, a Singapore-sling, etc. The drink selection switch 50, which is similar construction to the above-mentioned switch 33, is depressed closing contacts 51 and charging capacitor 53. When switch 50 is released, contacts 52 will be closed providing discharge path for capacitor 53 through the winding of relay 54. When relay 54 is energized, movable contact 55 will close with contact 56 sending an impulse from the source of potential 28 through a series of diodes 57 through 61 which are connected in parallel. There will be varying numbers of diodes connected to each selection switch, the number being determined by the contents of the beverage to be dispensed, plus one diode for operating the mixer 62. Mixer 62 consists of a motor unit 63 and a liquid container 64. In the example illustrated, diode 61 will send an impulse through closed contact 34 of switch 33 to energize the relay 37 thereby closing contacts 38 and 39 to energize the dispensing valve 32 through closed contacts 30 and 31. The dispensing valve 32 will dispense a measured amount of liquid 11 through pipe 44 to nozzle 45 and into the container 64 in the same manner as in the previously described single-shot operation. Energization of relay 37 will also close contacts 40 and 41 charging the previously mentioned capacitor 43. Relay 37 will be energized only for the duration that relay 54 is energized. When relay 54 de-energizes, relay 37 will likewise be deenergized causing contact 40 to break with contact 41 and close with contact 42. Contacts 38 and 39 will open to deenergizing and closing the dispensing valve 32.

The closed contacts 40 and 42 will provide a discharge path for capacitor 43 through the normally closed multi-drink selection switch 65 and the winding of the relay 66 to ground. Relay 66 will be energized, by capacitor 43, causing movable contacts 67 to close with contact 68 and movable contact 70 to break with contact 71. Contacts 67 and 68 will provide a closed circuit from the source of potential 28 to charge capacitor 72. Relay 66 will be deenergized, when capacitor 43 is discharged, thus contact 67 will break with contact 68 and make with contact 69 providing a discharge path for capacitor 72 through the off-winding of latching relay 75. This will cause the contacts 76 and 72 to be opened insuring the mixer motor will be deenergized at the end of the dispensing operation.

Diodes 58, 59 and 60 will be carrying out simultaneous dispensing of liquids from other containers to the mixer container 64 in a manner identical to that for bottle 10.

The impulse through diode 57 arriving at the on-winding 74 will cause latching relay 75 to be energized closing contacts 76 and 77 completing the circuit from the source of potential 28' through closed contacts 70 and 71, 76 and 77, and 78 and 79. The several liquids dispensed to the container 64 will be mixed at a high rate of speed after the liquids have been dispensed because contacts 70 and 71 are not closed until relay 37 has deenergized.

The dispensing of a beverage to be stirred at a low speed is somewhat similar to the above operation. Selection switch 50' is depressed closing contacts 51' and charging capacitor 53'. Releasing the switch 55 closes contacts 52' allowing capacitor 53' to discharge through the coil of relay 54'. Relay 54' will energize closing contacts 55' and 56' sending an impulse from the source of potential 28 through diodes 58', 61', 80, 81, and 82. Diodes 61' is connected in parallel with diode 61 and would accomplish the same dispensing operation that has been described above for the mixed-beverage cycle. Diodes 58', 80 and 82 will likewise dispense a measured amount of the appropriate liquids to mixer container 64. Diode 81 sends an impulse to the on-winding 84 of latching relay 83. The impulse energizes the relay closing contacts 86 and 87. Closing contacts 86 and 87 will energize relay 88 closing contacts 89 and 90 and 78 and 91 thereby providing a closed circuit from the source of potential 28' through closed contacts 70 and 71, contacts 89 and 90, and variable resistor 92 to the motor 63 of mixer 62. Resistor 92 is adjusted so that the motor will run at a desirable low speed. Variable resistor 92 allows the motor 63 to be adjusted to very low speed so that a drink, such as a Martini, may be stirred at a speed no greater than 5 r.p.m.

Switch 65 is a multi-drink switch. This normally closed switch has been mentioned previously. When it is desired to mix more than one unit of a mixed beverage, for instance six daiquiries, multi-switch 65 would be depressed while the appropriate drink selection switch 50 was depressed six successive times (allowing an interval for dispensing of each unit). The effect of depressing switch 65 is to delay the discharge of capacitor 43 through relay 66 thereby delaying energization of mixer motor 63 until after the last unit has been dispensed. This prevents the undesirable effect of mixing, with the resulting splashing, while attempting to dispense a plurality of units. Upon release of the switch 65, the normal stir or mix operation would take place.

In mixing multi-drinks, it may be desirable to have additional mixing or stirring. For this eventuality, switches 93 and 94 have been provided. Closing switch 93 will energize the mixer motor directly from the source of potential 28' through closed contacts 78 and 79. Closing switch 94 will energize relay 88 closing contacts 89 and 90 and 78 and 91 to energize the mixer motor through the closed contacts and resistor 92 to provide the desired low speed stirring.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore to be embraced therein.

What is claimed is:

1. A beverage dispensing machine comprising: a plurality of liquid containers having inputs and outputs, a source of pneumatic pressure connected to each said input, separate delivery conduits connected to receive liquid from the output of each said container and deliver same to a single stationary receptacle, a plurality of electronic beverage selecting means, means responsive to said beverage selecting means for controlling the flow of selected liquids to said receptacle, a fixedly mounted mixer means responsive to the termination of said liquid flow to energize said mixer and thereby cause said liquids to be mixed in said receptacle at rate of speed appropriately selected for the beverage being mixed.

2. A beverage dispensing machine according to claim 1 wherein normally open solenoid operated three-way pressure valve means are connected between each said input and said pneumatic pressure source, liquid sensing means connected to said delivery conduits, said liquid sensing means being responsive to said containers becoming empty to close said pressure valve means.

3. A beverage dispensing machine according to claim 2 wherein said pressure valve means in the closed position connects said container to an exhaust.

4. A beverage dispensing machine according to claim 2 including electrical indicator means which are activated when said liquid sensing means senses a liquid container being empty.

5. A beverage dispensing machine according to claim 1 wherein means are provided for overriding the actuation of said mixing means while dispensing more than one unit of the selected beverage.

6. A beverage dispensing machine according to claim 1 wherein means are provided to actuate said mixer for any length of time without dispensing any liquid.

7. A beverage dispensing machine according to claim 1 wherein said mixer is prevented from operating when a single liquid is dispensed.

8. In a beverage dispensing machine comprising a plurality of liquid containers, means for individually pressurizing said containers, separate delivery conduits connected to receive liquid from said container and deliver same through a solenoid operated dispensing valve to a single receptacle and a plurality of beverage selecting means, a means responsive to said selecting means for controlling the flow of the selected liquids through said dispensing valve, said responsive means comprising a capacitor, said capacitor being charged upon said selecting means being actuated, upon release of said selecting means said capacitor discharging through a coil of a relay thereby energizing said relay which in turn will energize said dispensing valve allowing an amount of liquid to be dispensed, the amount of liquid being determined by the time required for said capacitor to discharge through said relay coil.

9. A beverage dispensing apparatus comprising: a source of pneumatic pressure, a plurality of liquid containers having inputs and outputs, pressure valve means connecting each said container individually to said pressure source, liquid sensing means responsive to the liquid level in said container to close said pressure valve when said container is empty, separate delivery conduits connected to each said liquid container output to deliver liquid therefrom to a single receptacle, dispensing valve means in each said conduit, a plurality of beverage selecting means, each said beverage selecting means comprising a spring biased pushbutton switch, a capacitor and a relay, said switch in the depressed condition closing a circuit to charge said capacitor, said switch in the released condition closing a circuit for said capacitor to discharge through a coil of said relay thereby energizing said relay, means responsive to said beverage selecting means for controlling said dispensing valves to allow the selected liquids to flow from their respective containers to said receptacle, a mixer, said mixer being mounted in said receptacle, means to energize said mixer to an appropriate rate of speed after the liquids have been dispensed.

10. A beverage dispensing apparatus according to claim 9 wherein said pressure valve is a three-way solenoid controlled valve, said valve being open to connect said pressure source and said liquid container when said solenoid is deenergized, said valve being closed to connect said liquid container to an exhaust and shutting off said pressure source when said solenoid is energized.

11. A beverage dispensing apparatus according to claim 9 wherein a check valve is connected to the output of each said container, said check valve preventing liquid from returning to said container.

12. A beverage dispensing apparatus according to claim 9 wherein said liquid sensing means comprises a float container, a float therein, a switch actuable by said float, said switch closing thereby energizing and closing said pressure valve when the liquid level in said float container indicates said liquid container is empty.

13. A beverage dispensing apparatus according to claim 9 wherein said receptacle is a blender.

14. A beverage dispensing apparatus according to claim 9 wherein said relay closes a circuit to send a pulse to at least one diode thereby causing an associated dispensing valve to be energized when said relay is energized.

15. A beverage dispensing apparatus according to claim 14 wherein a diode is provided to energize said mixer.

16. A beverage dispensing machine according to claim 9 wherein said mixer is selectively energized at high and low rates of speed in accordance with the drink selected, means connected to said mixer for adjusting the low rate of speed.

References Cited by the Examiner
UNITED STATES PATENTS

| | | | |
|---|---|---|---|
| 1,836,893 | 12/1931 | Austin | 222—65 X |
| 2,669,941 | 2/1954 | Stafford | 222—66 X |
| 2,995,158 | 8/1961 | Oberg | 222—129.4 X |
| 3,124,056 | 3/1964 | Hayes | 222—65 |

ROBERT B. REEVES, *Primary Examiner.*

HADD S. LANE, *Examiner.*